US007557300B2

(12) United States Patent
Thompson et al.

(10) Patent No.: US 7,557,300 B2
(45) Date of Patent: Jul. 7, 2009

(54) FLEXIBLE HIGH TEMPERATURE CABLES

(75) Inventors: Scott Thompson, Calgary (CA); Trevor Kwasnycia, Calgary (CA); Sofiane Benhaddad, Calgary (CA)

(73) Assignee: Versa Power Systems, Ltd., Calgary, Alberta (CA)

(*) Notice: Subject to any disclaimer, the term of this patent is extended or adjusted under 35 U.S.C. 154(b) by 0 days.

(21) Appl. No.: 10/710,368

(22) Filed: Jul. 5, 2004

(65) Prior Publication Data

US 2006/0000632 A1 Jan. 5, 2006

(51) Int. Cl.
*H02G 15/02* (2006.01)

(52) U.S. Cl. .................................................... 174/74 R

(58) Field of Classification Search ............... 174/74 R, 174/78, 102 D, 106 R; 439/357, 607
See application file for complete search history.

(56) References Cited

U.S. PATENT DOCUMENTS

| | | | | | |
|---|---|---|---|---|---|
| 450,589 | A | * | 4/1891 | Marsh | 174/135 |
| 2,399,103 | A | * | 4/1946 | Clinedinst | 285/55 |
| 2,987,329 | A | * | 6/1961 | Barton | 285/222.5 |
| 3,002,047 | A | * | 9/1961 | Mannella | 174/124 R |
| 3,204,332 | A | * | 9/1965 | Blaisdell | 228/186 |
| 3,347,977 | A | * | 10/1967 | Scoran et al. | 174/74 R |
| 3,389,368 | A | * | 6/1968 | Schaefer | 439/522 |
| 3,608,182 | A | | 9/1971 | Hughes et al. | |
| 3,800,017 | A | | 3/1974 | Williams et al. | |
| 3,900,701 | A | | 8/1975 | Bayles et al. | |
| 4,297,526 | A | * | 10/1981 | Leuchs et al. | 174/102 R |
| 4,629,274 | A | | 12/1986 | Pollock | |
| 5,243,675 | A | | 9/1993 | Kathiresan et al. | |
| 5,538,294 | A | * | 7/1996 | Thomas | 285/55 |
| 6,319,376 | B1 | | 11/2001 | Graser et al. | |

FOREIGN PATENT DOCUMENTS

| | | |
|---|---|---|
| JP | 8329756 | 12/1996 |
| WO | WO 97/02624 | 1/1997 |
| WO | WO 01/97460 | 12/2001 |

* cited by examiner

*Primary Examiner*—Chau N Nguyen
(74) *Attorney, Agent, or Firm*—Bennett Jones LLP

(57) ABSTRACT

A high-temperature, flexible conductive cable is formed from a solid copper core, sheathed and hermetically sealed in a flexible stainless steel sheath, which may be corrugated.

9 Claims, 2 Drawing Sheets

FLEXIBLE HIGH TEMPERATURE CABLES

BACKGROUND OF INVENTION

The present invention relates to flexible electrical conductor cables suitable for high temperature installations.

Solid oxide fuel cells, along with other high temperature fuel cells, typically operate at temperatures well in excess of 500° C., and often in the range of 800° C. or higher. It is a challenge to find electrical conducting cables for use in such a high temperature environment which have an adequately low electrical resistance, resist thermal degradation at such elevated temperatures, and which may survive repeated thermal cycling from ambient temperatures to operating temperatures.

Several commercially available high temperature cables do not perform satisfactorily. For example, Radix MCS™ Furnace Cables comprise a solid or stranded nickel core which is sheathed with an insulator and protective cover. The insulator comprises a braided mica layer and a braided ceramic fibre layer. The protective cover comprises a braided stainless steel layer. These cables are suitable for high temperature AC application but when used with a DC power source such as a fuel cell, they demonstrate unacceptably high voltage drops. Other combinations of conducting cores and braided or smooth stainless steel sheaths have been similarly unsuccessful.

Therefore, there is a need in the art for a high temperature electrical conductor cable which mitigates the difficulties of the prior art.

SUMMARY OF INVENTION

An electrical conducting cable comprising:

(a) a conductive core having terminal lugs at each end;

(b) a flexible, gas impermeable sheath which is hermetically sealed to each of the terminal lugs.

In one embodiment, the cable consists essentially of the conductive core and sheath as described above.

BRIEF DESCRIPTION OF DRAWINGS

The invention will now be described by way of an exemplary embodiment with reference to the accompanying simplified, diagrammatic, not-to-scale drawings. In the drawings.

DETAILED DESCRIPTION

The present invention provides for an electrical conducting cable suitable for use in high temperature environments such as with high temperature fuel cell stacks, and solid oxide fuel cell stacks in particular. When describing the present invention, all terms not defined herein have their common art-recognized meanings.

Figure 1:
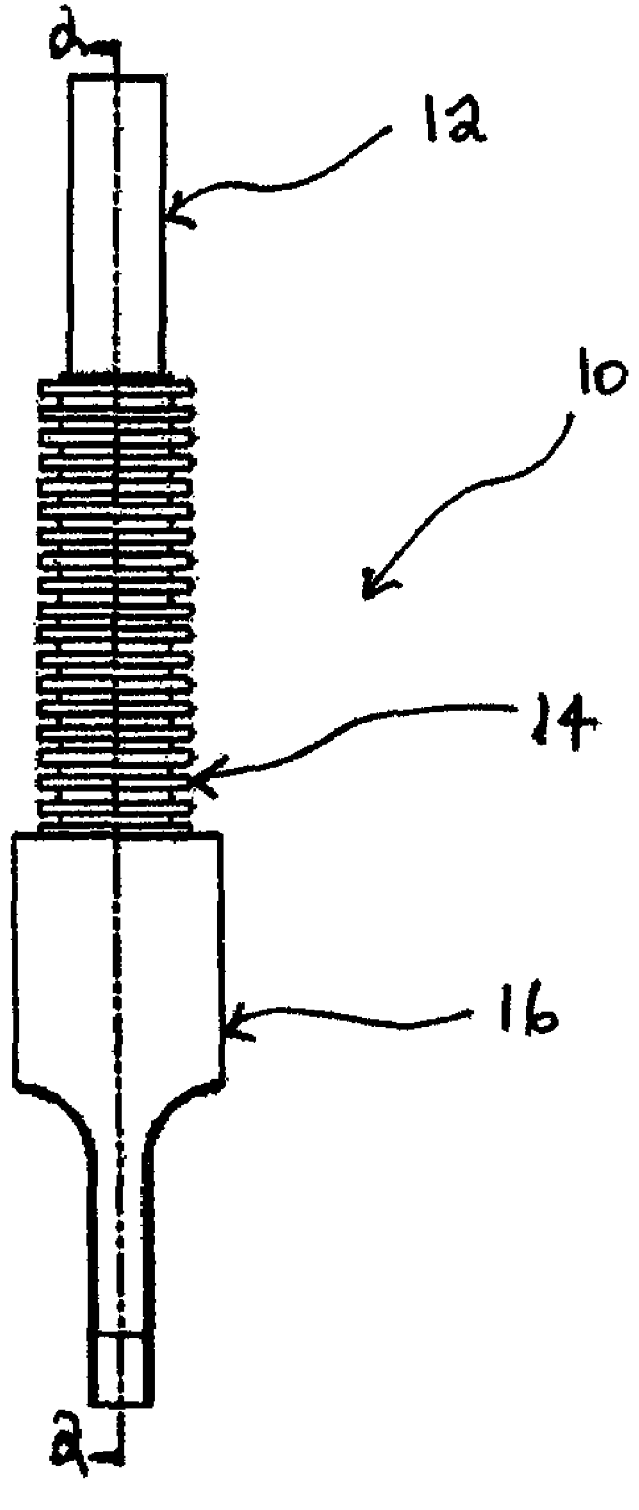
FIG. 1 is an cut-away view of one end of a cable of the present invention.
Figure 2:
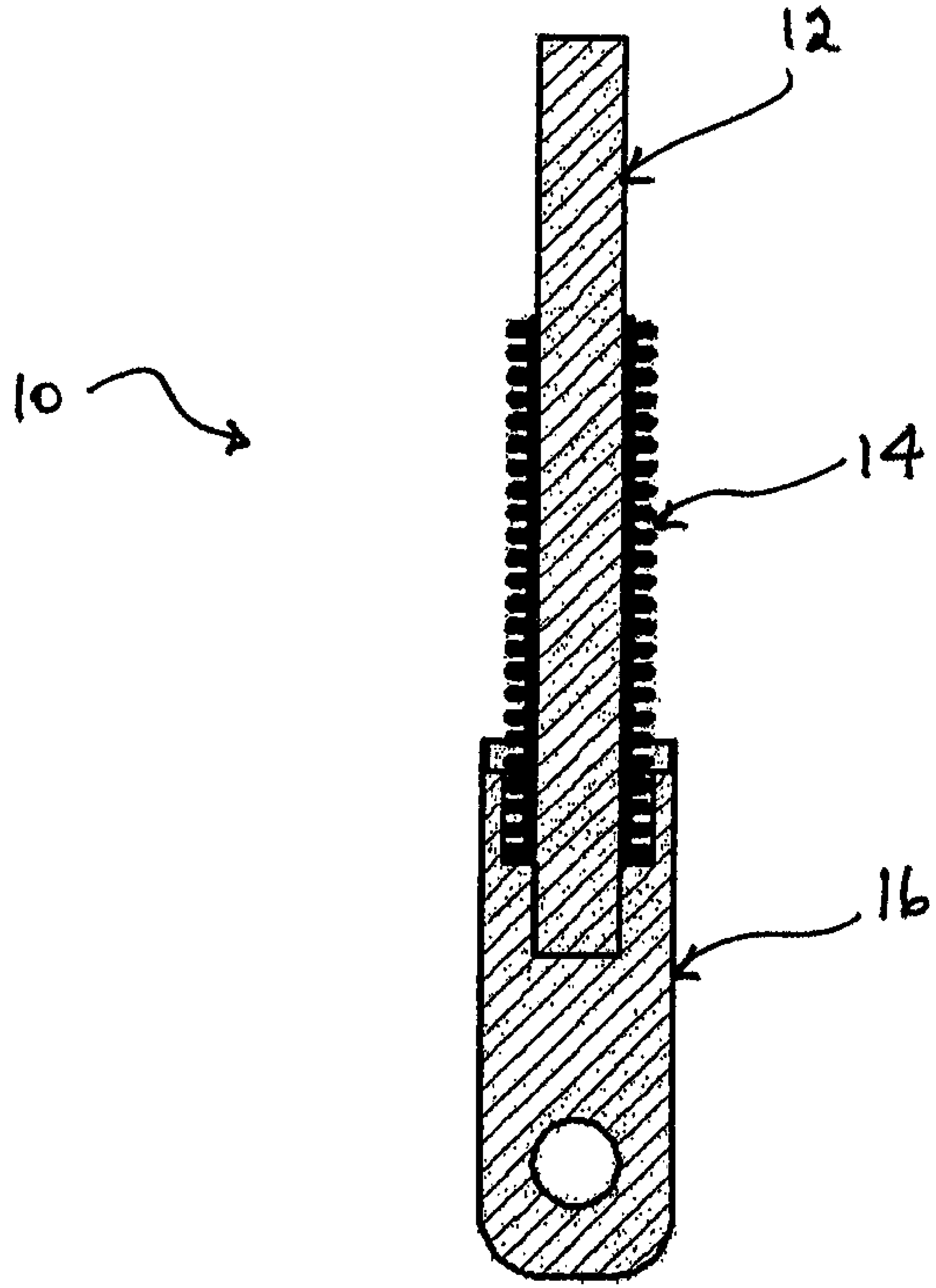
FIG. 2 is a cross-sectional view along line 2-2 in FIG. 1.

As seen in FIG. 1, a cable (10) of the present invention comprises a conducting core (12) with a corrugated flexible sheathing (14). The core (12) is connected to a terminal lug (16) although the sheath in FIGS. 1 and 2 are cut-away to show the core, the core (12) is hermetically sealed within the sheath (14) as the sheath is brazed to a terminal lug at both ends of the cable (10).

In one embodiment, the conducting core (12) comprises a highly conductive metal or metal alloy which may comprise copper, nickel, or silver, or alloys thereof. Aluminum may be used as an alloying element in smaller quantities, however, it cannot be used in pure form because of its relatively low melting temperature. In one preferred embodiment, the core comprises substantially pure copper. The corrugated sheathing (14) preferably but not necessarily comprises a stainless steel or any other oxidation resistant alloy. The corrugated sheathing must be gas-impermeable at all intended operating temperatures. High temperature alloys such as Inconel□ are suitable but may not provide added benefits commensurate with their additional expense. The terminal lug (16) may be formed from any conductive metal but is preferably formed from a stainless steel or Inconel□ or the like. The corrugations in the sheathing (14) enhances the flexibility of the cable (10).

In one embodiment, the cable (10) does not require an insulating layer between the outer sheath (14) and the conducting core (12). The cable (10) is robust enough to perform satisfactorily at high temperatures without such an insulating layer.

The electrical capacity of the cable is related to the diameter and length of the conductive core. Those skilled in the art, with minimal and routine experimentation, will be able to determine the optimum and minimum satisfactory settings in each instance.

One method of ensuring a hermetic seal between the conducting core (12), the sheathing (14) and the terminal lug (16) is to join them by vacuum brazing. A paste of Ni-braze alloy BNi-3 is inserted into the terminal lug cavity, coating the internal surfaces to which the conducting core and the sheathing will be bonded to. The conducting core is inserted in the corrugated sheathing which is cut slightly shorter than the length of the core. The end of the conducting core and corrugated sheathing is inserted into the terminal lug cavity already coated with braze alloy paste. The assembly is put on fixtures designed to keep the braze alloy paste from flowing out of the terminal lug, heated in a vacuum furnace to a brazing temperature of 1040° C. and held for an hour before cooling.

The method of joining must of course provide adequate electrical contact between the terminal lugs and the core.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

The invention claimed is:

1. A single electrical conducting cable comprising:

(a) a conductive core having solid one-piece terminal lugs at each end, wherein said lugs comprise an oxidation resistant alloy;

(b) a single gas impermeable sheath comprising an oxidation resistant alloy and having an inner surface and an outer surface, the outer surface of which is hermetically sealed using a heat resistant braze to each of the terminal lugs, thereby entirely encasing the conductive core.

2. The cable of claim 1 wherein the conductive core comprises copper, nickel, aluminum, or silver, or alloys thereof.

3. The cable of claim 2 wherein the conductive core comprises copper.

4. The cable of claim 1 wherein the sheath is flexible and comprises a corrugated metal resistant to oxidation.

5. The cable of claim 4 wherein the corrugated metal comprises a stainless steel.

6. An electrical conducting cable consisting essentially of:

(a) a conductive core having solid one-piece terminal lugs at each end;

(b) a single gas impermeable sheath having an inner surface and an outer surface, the outer surface of which is hermetically sealed to each of the terminal lugs, wherein the sheath is flexible and comprises a corrugated metal resistant to oxidation.

7. The cable of claim 6 wherein the conductive core comprises copper, nickel, aluminum, or silver, or alloys thereof.

8. The cable of claim 7 wherein the conductive core comprises copper.

9. The cable of claim 6 wherein the corrugated metal comprises a stainless steel.

* * * * *